Sept. 7, 1965  J. P. FRANCIS  3,205,000
AUTOMOBILE RAIN VISOR AND SUPPORTING MEANS THEREFOR
Filed Dec. 3, 1963
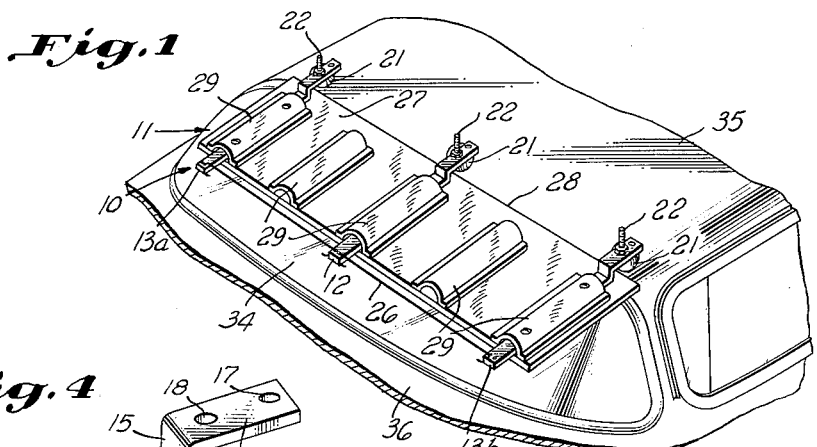
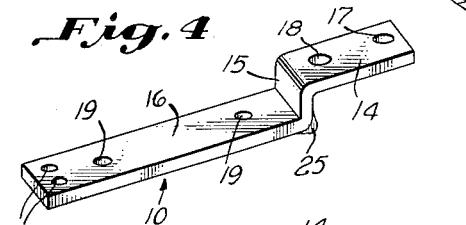
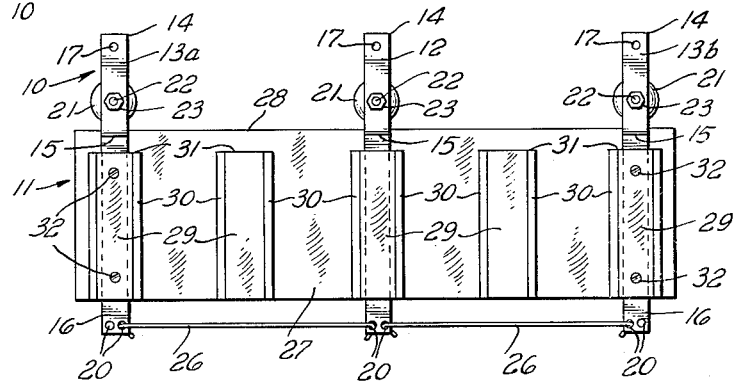
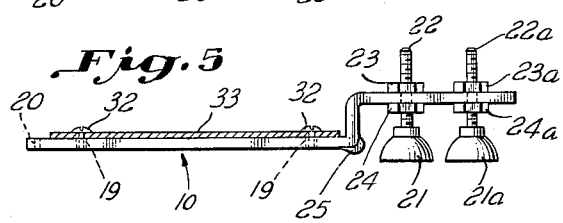
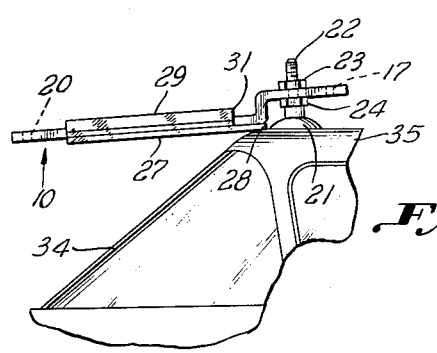
INVENTOR
John P. Francis

United States Patent Office 3,205,000
Patented Sept. 7, 1965

3,205,000
AUTOMOBILE RAIN VISOR AND SUPPORTING MEANS THEREFOR
John P. Francis, 20 Boston St., Haverhill, Mass.
Filed Dec. 3, 1963, Ser. No. 328,159
5 Claims. (Cl. 296—95)

This invention relates to windshield rain visors and visor supporting means for motor vehicles, and more particularly to a temporary or removable rain visor device for use in protecting the windshield area of the vehicle from rain, sleet or snow when the vehicle is parked in a drive-in theatre or other outdoor parking area.

A main object of the invention is to provide a novel and improved rain visor and supporting members for fast and simple attachment and removal to and from a motor vehicle, the entire device being very simple in construction and assembly, and very effective in protecting the windshield area from any of the elements of the weather.

A further object of the invention is to provide an improved rain visor device adapted to span the entire lateral portion of the windshield, or any reduced lateral portion thereof, or at any desired lateral area of the said windshield.

A still further object of the invention is to provide an adjustably supported rain visor which may be supported in free frictional and rain sealing engagement with the roof top, or adjustably and movably supported in either or both a vertically spaced apart and longitudinally angular supporting position over the roof top and the winshield area.

A still further and important object, of one embodiment of the rain visor device, is to provide a flexible fabric rain visor panel, which is fully foldable and made compact around the visor supports as a very small and compact unit for stowage and issuance within the drive-in theatre, or for temporary stowage within the vehicle, such as under the seat or on the floor.

With these objects and still others in view, as will hereinafter more fully appear, the invention comprises certain novel constructions, combination and arrangement of parts, hereinafter described and claimed and illustrated in the accompanying drawings, in which:

FIGURE 1 is a perspective view, in fragment, of the front portion of an automobile, the view including a pespective view of the rain visor and the supporting means for supporting the rain visor over the roof top and the windshield.

FIGURE 2 is a top plan view of the rain visor shown attached and supported to the visor supports.

FIGURE 3 is a side elevation view, showing the rear edge of the rain visor on the roof top with the rain visor being supported from the supporting means.

FIGURE 4 is a side elevation view of the structural shape of the rain visor support; and FIGURE 5 is a side elevation cutaway view of a modified form of a rigid or semi-rigid rain visor, shown supported on a rain visor support which is supported from a pair of vacuum cups.

Referring now more specifically to the drawings, attention is directed primarily to FIGURES 1 and 2, wherein numeral 10 generally indicates the rain visor supports, shown also specifically as supports 12, 13a and 13b. Numeral 11 generally indicates the rain visor structure, shown also specifically as a flexible fabric visor 27, and in FIGURE 5 as a rigid or semi-rigid visor 33.

In FIGURE 1, a portion of an automobile 36 is shown with the rain visor 27, which in this embodiment is made of a flexible waterproof fabric material, being supported by the longitudinally disposed frame supports 10. The frame supports 10, shown specifically at the center as 12, and at the opposite lateral ends of the rain visor 27 as 13a and 13b, are supported on the roof top 35 by the vacuum cups 21.

To support the rain visor supports 10, first, the supporting means, comprising the roof engaging vacuum cups 21 with the attached threaded stud members 22 and the stud attached vertically adjustable upper 23 and lower 24 threaded nut members, are either removably or permanently attached to the roof top 35 at the desired location, laterally and longitudinally, as may be noted from FIGURES 1 and 3.

The structure of the rain visor support 10, FIGURE 4, includes an upper rear longitudinal portion 14 provided with stud engaging apertures 17 and 18. A vertical portion 15 extends downwardly from the said rear portion 14, with a forwardly extending lower longitudinal portion 16 projecting from said vertical portion 15. The said lower portion 16 is provided, at the junction of portions 15 and 16, with a rubber coated area 25 which is adapted to frictionally engage the roof top 35 for forward free frictional support thereto. The longitudinally spaced apart apertures 19 are adapted to engage the visor pin securing members 32, as shown in FIGURES 2 and 5. The laterally spaced apart apertures 20 engage the hooked-end rod members 26, as shown in FIGURES 1 and 2.

The visor support 10, FIGURE 4, is preferably rectangular in cross section and constructed of metal or plastic material, with metal being preferred, thereby providing longitudinally angular adjustment of lower portion 16 manually bending the said lower portion 16 as desired, the said adjustment being independent of the wide range of adjustments provided by the supporting means 21, 22, 23 and 24. Two or more visor supports 10 may be used to support the flexible rain visor 27, whereas, one or more visor supports 10, such as a single central visor support 12 may be used to support the rigid rain visor 33 of FIGURE 5.

In FIGURES 1, 2 and 3, a rain visor 27 is shown which is provided with open end longitudinally disposed sleeves 29 having flat side tab members 30 which are formed to or cemented to visor 27, or secured by other suitable means. The extreme rear end 31 of the sleeve 29, which is longitudinally shorter than the rain visor 27, enables rear lateral edge 28 of the said rain visor 27 to engage the roof top 35 for free frictional supporting and rain sealing engagement thereon. The lateral edge 28 is thereby adapted to be extended forwardly or rearwardly of the vertical portion 15 of the visor support 10.

Referring back to FIGURE 5, a modified rain visor device is shown. The rigid or semi-rigid visor panel 33 may be constructed of waterproof cardboard, thin Masonite, sheet metal, plastic, or other suitable preferably thin and light material which is longitudinally rigid and laterally flexible. The visor 33 is shown mounted above the support 10, whereas, the visor 27 in FIGURES 1, 2 and 3 is shown supported below the support 10 by the sleeves 29. It is quite apparent therefore, the each type of rain visor may be reversed in the manner of support, either above or below the said visor supports 10.

The visor support 10, FIGURE 5, is shown supported by a pair of longitudinally spaced apart vacuum cups 21 and 21a and the attached threaded stud members 22 and 22a with vertically adjustable upper 23 and 23a, and lower 24 and 24a threaded nut members on said stud members. The adjustable vertically spaced apart, or the longitudinally angular adjustment of the visor support 10, is provided upon the vertical adjustment of the selected threaded nut members 23, 23a, 24 and 24a on the said threaded stud members 22 and 22a.

Attachment of the rain visor 27, to the visor supports 10, is accomplished upon the longitudinally sliding engagement of the open end sleeves 29 of the said visor 27, to the said supports 10. Engagement of the upper and lower rear lateral portion 28 of the rain visor 27, between the junction area 25 and the roof top, provides free frictional securing engagement of the said rain visor.

The visor support 10, at the junction area 25, normally engages the roof top when the vacuum cup 21 is fully compressed and secured to the roof top 35. The vertically disposed portion 15, of support 10, extends downwardly slightly forward of the vacuum cup 21. The movable threaded nut members 23 and 24 on the stud member 22 therefore provides vertical and angular adjustment of the rain visor.

Visor pin securing members 32 may be used when needed, such as during severe windstorms, to engage and secure the outer longitudinal ends of the said rain visor. It is also apparent, that upon reducing the lateral width of the outer supports 13a and 13b, to engage the selected inner sleeves 29, the unsupported free ends of the flexible rain visor 27 will hang downwardly, thereby providing additional weather protection to the windshield area 34.

Referring back to FIGURES 1 and 2, the laterally disposed hooked-end rod members 26, shown engaging the apertures 20 of the visor supports 10, are adapted to prevent lateral movement of any of the visor supports 10 due to sleet, snow or strong winds affecting the flexible fabric rain visor 27, when supported mainly from the single vacuum cup 21 on each support 10.

The rain visor device may be similarly supported on the roof top 35, and over the rear window, or supported laterally, to protect a side window, as for example while parked in a drive-in restaurant.

The extreme simplicity in the structure and the assembly thereof; the very simple functional operations in the installation, adjustment and the removal of the device, and; the compactness of the device in the handling and the stowage of same; these objects all being enjoyed and benefited by both the management and the patrons during inclement weather conditions, while viewing outdoor movies or the like, or other outdoor activities.

While certain embodiments of my invention have been disclosed in the foregoing description, it will be understood that various modifications may occur to those skilled in the art. Changes, therefore, in the construction and arrangement, may be made without departing from the spirit and the scope of the invention as disclosed in the appended claims.

I claim:

1. A rain visor for the windshield of a motor vehicle secured to the roof top thereof comprising a removably attached flexible rain visor panel, a plurality of visor supports, each of said supports having an upper longitudinally disposed rear portion, a downwardly disposed vertical portion depending from the forward end of the said upper rear portion, and a lower longitudinally disposed portion projecting forwardly from the said downwardly disposed portion, the rearmost underside area of the said lower portion at the said vertical portion adapted to frictionally engage the roof top for frictional supporting engagement thereto, roof engaging means mounted on the roof top adjustably engaging the said longitudinally disposed upper rear portion in supporting said visor support over the roof top and the windshield area, said lower longitudinal portion of said visor supports adjustably supporting said removably attached rain visor panel thereon and over the roof top and the windshield area.

2. A rain visor for the windshield of a motor vehicle secured to the roof top thereof comprising a removably attached flexible rain visor panel, a plurality of visor supports, each of said supports having an upper longitudinally disposed rear portion, a downwardly disposed portion depending from the forward end of the said upper rear portion, and a lower longitudinally disposed portion projecting forwardly from the said downwardly disposed portion, roof engaging means mounted on the roof top adjustably engaging the said longitudinally disposed upper rear portion in supporting said visor support over the roof top and the windshield area, said lower longitudinal portion of said visor supports adjustably supporting said removably attached rain visor panel thereto with the rearmost lateral portion of said flexible visor panel adapted to frictionally engage the lateral contour of the roof top in frictional supporting and rain sealing engagement thereto upon the downward pressure exerted in the engagement of the said rearmost underside areas of the said lower portions of said visor supports on the upper surface of the said rain visor panel in securing said rear portion of said rain visor panel.

3. A rain visor for the windshield of a motor vehicle secured to the roof top thereof comprising a removably attached flexible rain visor panel, longitudinally disposed sleeves on said rain visor panel, a plurality of longitudinally disposed visor supports, each of said supports adapted to engage the selected said sleeves in adjustably supporting said visor panel, each of said visor supports having an upper longitudinally disposed rear portion, a downwardly disposed vertical portion depending from the forward end of the said upper rear portion, and a lower longitudinally disposed portion projecting forwardly from the said downwardly disposed portion, the rearmost underside area of the said lower portion at the said vertical portion adapted to frictionally engage the roof top for frictional supporting engagement thereto, laterally spaced apart roof engaging means mounted on the roof top adjustably engaging the said longitudinally disposed upper rear portion in supporting said visor supports over the roof top and the windshield area, said lower longitudinal portions of said visor supports adjustably supporting said removably attached rain visor panel thereon and over the roof top and the windshield area.

4. A rain visor for the windshield of a motor vericle secured to the roof top thereof comprising a removably attached flexible rain visor panel, longitudinally disposed sleeves on said rain visor panel, a plurality of longitudinally disposed visor supports, each of said supports adapted to engage the selected said sleeves in adjustably supporting said visor panel, each of said visor supports having an upper longitudinally disposed rear portion, a downwardly disposed portion depending from the forward end of the said upper rear portion, and a lower longitudinally disposed portion projecting forwardly from the said downwardly disposed portion, laterally spaced apart roof engaging means mounted on the roof top adjustably engaging the said longitudinally disposed upper rear portion in supporting said visor supports over the roof top and the windshield area, said lower longitudinal portions of said visor supports adjustably supporting said removably attached rain visor panel thereto with the rearmost lateral portion of said flexible visor panel adapted to frictionally engage the lateral contour of the roof top in frictional supporting and rain sealing engagement thereto upon the downward pressure exerted in the engagement of the said rearmost underside areas of the said lower portions of said visor supports on the upper surface of the said rain visor panel in securing said rear portion of said rain visor panel.

5. A rain visor for the windshield of a motor vehicle secured to the roof top thereof comprising a removably attached rain visor panel, a visor support having an upper longitudinally disposed flat rear portion, a downwardly disposed flat vertical portion depending from the forward end of the said upper rear portion, and a lower longitudinally disposed flat portion projecting forwardly from the said downwardly disposed portion, the rearmost underside area of the said lower portion of the said vertical portion adapted to frictionally engage the roof top for frictional supporting engagement of the said lower portion of the said visor support to the roof top, roof engaging means mounted on the roof top and engaging the said longitudinally disposed upper rear portion in supporting said visor support therefrom and over the roof top and the windshield area, said lower longitudinal portion of said visor support supporting said removably attached rain visor panel thereto.

References Cited by the Examiner

UNITED STATES PATENTS

| | | | |
|---|---|---|---|
| 1,204,122 | 8/16 | Bowman | 160—368 |
| 3,088,772 | 5/63 | Francis | 296—95 |

BENJAMIN HERSH, *Primary Examiner.*

A. HARRY LEVY, *Examiner.*